United States Patent
Bassi et al.

[11] Patent Number: 5,819,809
[45] Date of Patent: Oct. 13, 1998

[54] CONNECTORS FOR INHIBITING RESONANCE OF COIL SPRINGS

[75] Inventors: Dario Bassi, Chaponnay; Patrick Vessella, Decines, both of France

[73] Assignee: Staubli Lyon, Chassieu, France

[21] Appl. No.: 423,720

[22] Filed: Apr. 18, 1995

[30] Foreign Application Priority Data

Apr. 19, 1994 [FR] France .................................. 94 05043

[51] Int. Cl.⁶ .............................. D03C 3/40; F16F 13/02; F16F 1/12
[52] U.S. Cl. ................................. 139/85; 24/298
[58] Field of Search ....................... 24/625, 298; 139/85, 139/88, 89

[56] References Cited

U.S. PATENT DOCUMENTS

| 393,595 | 11/1888 | Veatch | 24/298 |
| 2,267,558 | 12/1941 | Fernberg | 24/265 |
| 4,245,377 | 1/1981 | Soltes | 24/265 |
| 4,385,754 | 5/1983 | Waite . | |
| 5,309,950 | 5/1994 | Bassi et al. | 139/85 X |
| 5,379,496 | 1/1995 | Krauss | 24/625 |

FOREIGN PATENT DOCUMENTS

| 533636A1 | 9/1992 | European Pat. Off. . | |
| 547303A1 | 9/1992 | European Pat. Off. . | |
| 2674264 | 9/1992 | France . | |
| 002677999 | 12/1992 | France | 139/85 |
| 8913482.6 | 1/1990 | Germany . | |

*Primary Examiner*—Andy Falik
*Attorney, Agent, or Firm*—Dowell & Dowell

[57] ABSTRACT

Connecting devices for assembling the ends of helical springs with respect to other members wherein each connecting device includes at least two elastic branches adapted to frictionally engage with the end coils of a helical spring to thereby prevent the resonance of the spring when it is subjected to extension and compression. The connecting devices are particularly adapted for use for damping springs associated with the heddles in a weaving loom.

15 Claims, 4 Drawing Sheets

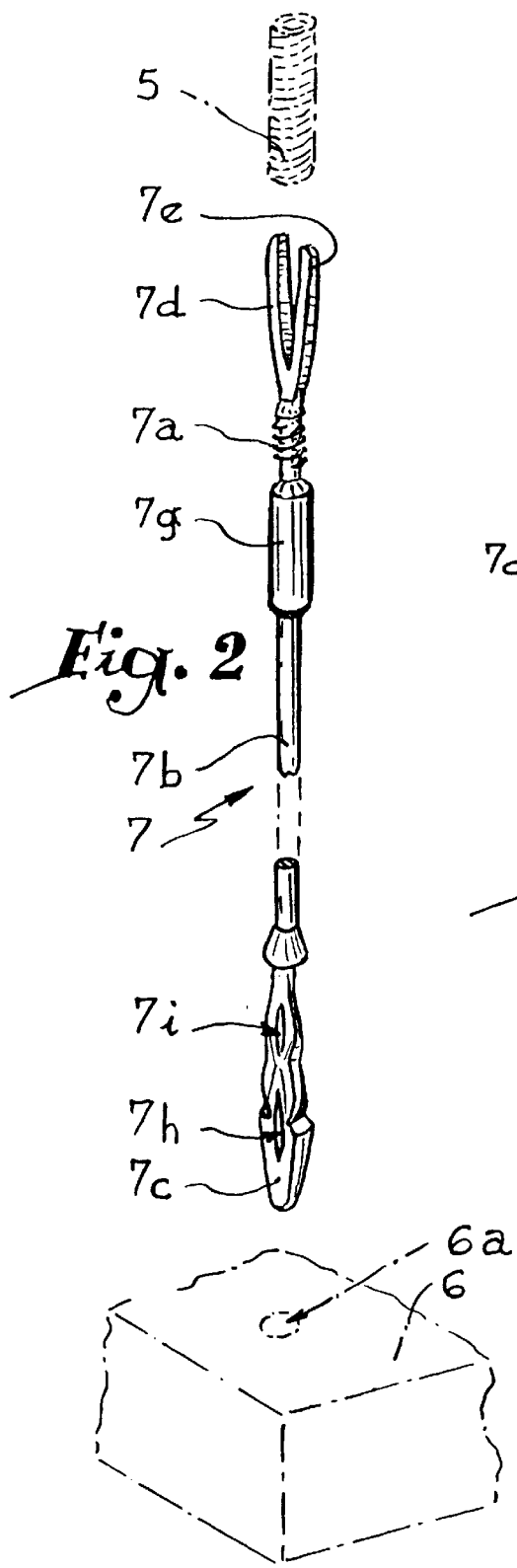
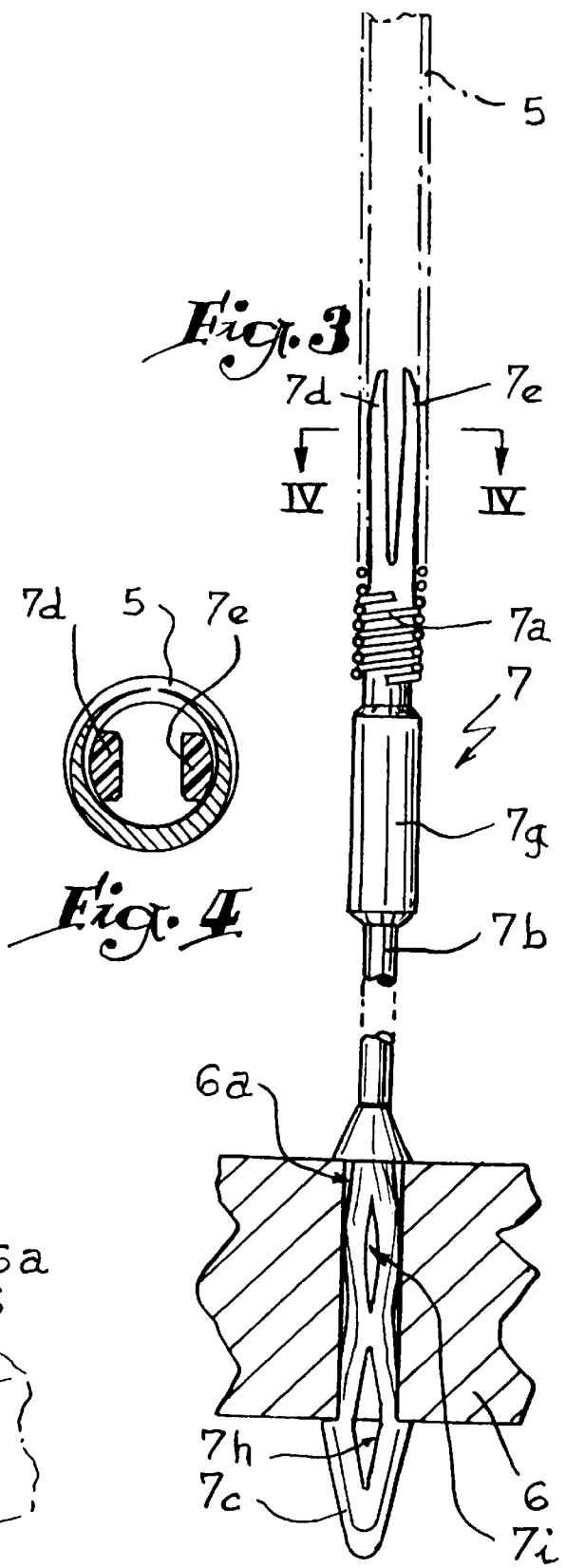

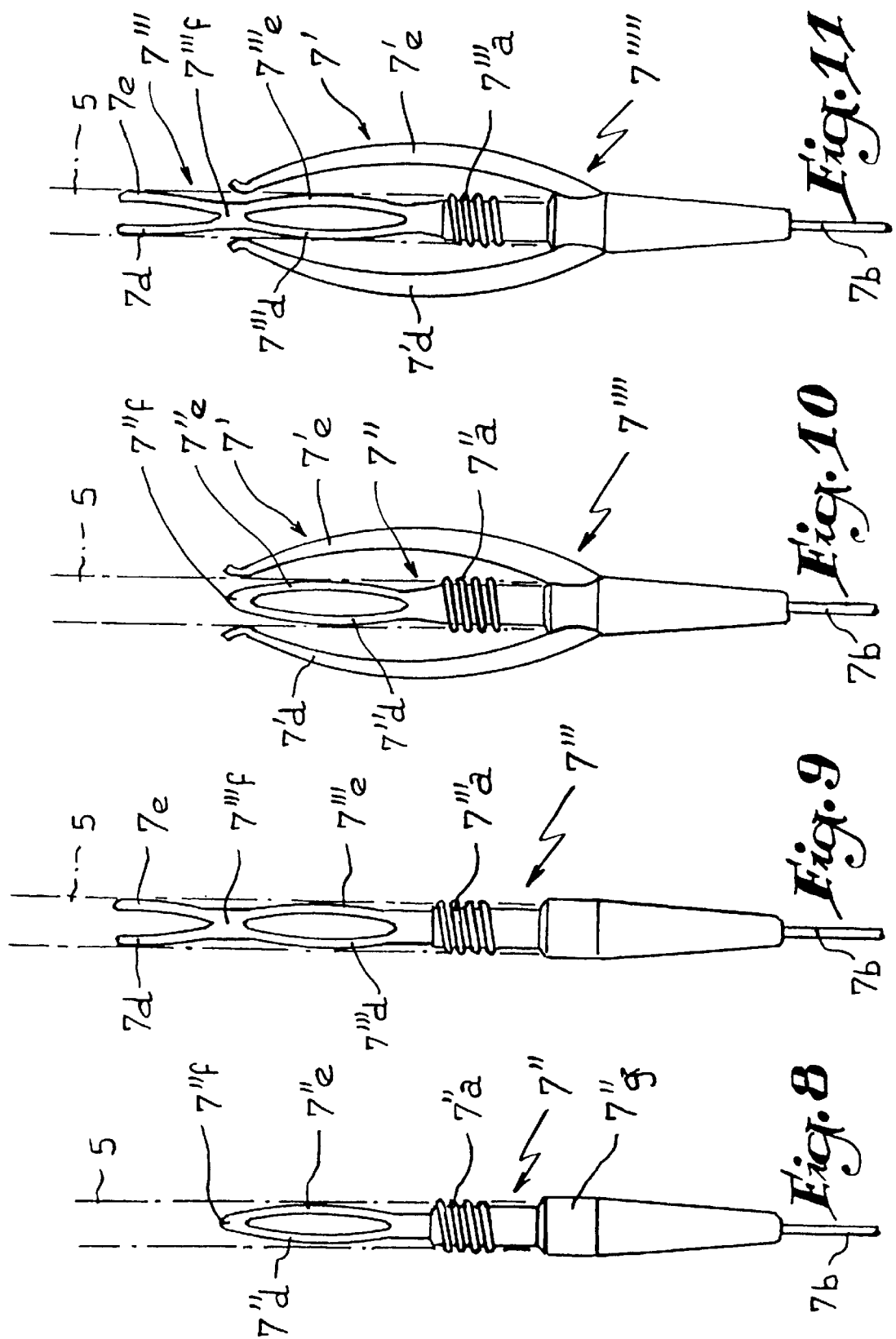

CONNECTORS FOR INHIBITING RESONANCE OF COIL SPRINGS

FIELD OF THE INVENTION

The present invention relates to devices for assembling or connecting the end of a helical spring with respect to another member and more particularly, but not exclusively, to a device for assembling one of the ends of a helical spring and the lower frame of a weaving loom, the other end of said spring being associated with the heddle of a weaving system.

HISTORY OF THE RELATED ART

Each hook of a weaving system of the Verdol type is known to be associated with a multiplicity of cords constituting what is called a harness, each cord being attached to the upper end of a heddle of which the lower end is associated with the upper end of a helical spring, of which the other end is fixed.

In modern weaving systems, each hook makes a very large number of reciprocating displacements at a high rate, with the result that the springs are subjected to brutal stresses of extension which sometimes lead to resonance and break thereof. Experience has shown that such break generally occurs at some number of turns from the end of the spring which is attached to a fixed member.

Known devices for assembling or connecting the end of a helical spring and another member such as a fixed member, are generally made of a moulded plastic material and they comprise a threaded connecting piece which engages by screwing in the first turns of the corresponding end of the helical spring. Such devices further comprise means for fastening to another member.

One of the devices in question, which formed the subject matter of French Patent Application 2 674 264, further comprises a cylindrical piece of elastic material engaged by force in the corresponding end of the spring so as to dampen its oscillations.

However, such a device cannot be used, as it is extremely difficult to introduce the cylindrical piece inside the turns of the spring and the turns are very often deteriorated as the return springs for weaving loom heddles are of very small dimensions. Such a spring is, for example, made with wire of very small diameter wound to constitute turns of about 2 mm diameter.

It is an object of the improvements forming the subject matter of the present invention to overcome the drawbacks of the heretofore known devices.

SUMMARY OF THE INVENTION

To overcome the deficiencies in the prior art, the cylindrical piece forming the subject matter of French Patent Application 2 674 264 is replaced by an element constituted by at least two elastic branches adapted to cooperate to create a friction fit which eliminates the resonance of the spring when it is subjected to successive rapid movements.

BRIEF DESCRIPTION OF THE DRAWINGS

The invention will be more readily understood on reading the following description with reference to the accompanying drawings, in which:

FIG. 2 is a view in perspective illustrating a first embodiment of an assembly or connecting device according to the invention.

FIG. 3 is a view in partial section illustrating the device of FIG. 2 mounted with respect to the end of a spring and of another member in order to connect the latter to the spring.

FIG. 4 is a section, on a larger scale, along IV—IV (FIG. 3).

FIG. 8 illustrates another embodiment of the device according to the invention.

FIG. 9 shows an assembly device according to the invention made by combining the devices of FIGS. 2 and 8.

FIG. 10 illustrates another embodiment of the invention, consisting in combining the devices of FIGS. 5 and 8.

Finally, FIG. 11 shows an embodiment of the invention consisting in an assembly device made by combining the devices illustrated in FIGS. 5 and 9.

DESCRIPTION OF PREFERRED EMBODIMENTS

Figure 1:
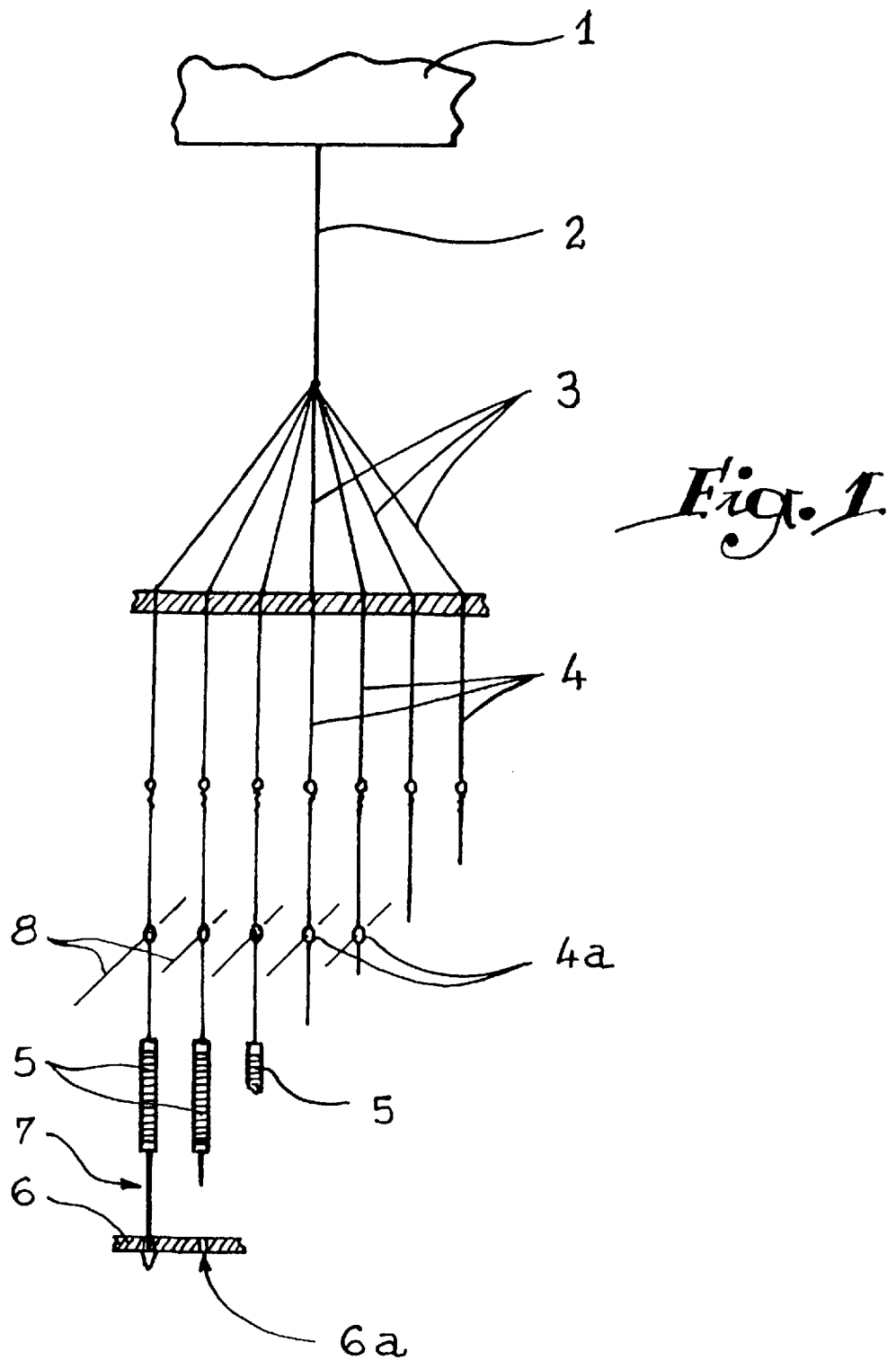
FIG. 1 is a very schematic view of part of a weaving system harness of which the heddles are each returned by a helical spring.

Referring now to the drawings, FIG. 1 very schematically illustrates part of a weaving system 1 comprising a multiplicity of hooks, of which only one, 2, has been shown.

The lower end of this hook is associated with a multiplicity of cords 3 forming, in well known manner, a harness while the other end of each cord is hooked to the upper end of a heddle 4 of which the lower end is associated with the upper end of a helical spring 5. The lower end of each spring is fixed to a fixed member 6 by means of a connecting device 7. Each heddle comprises, of course, an eye 4a traversed by a warp thread 8.

As illustrated in FIG. 2, the connecting device 7 according to the invention is in the form of a device comprising firstly, in known manner, a threaded connecting piece 7a which extends downwardly by a rod 7b terminating in a harpoon-shaped element 7c adapted to engage in a perforation 6a in the fixed member 6.

It will be observed that the harpoon 7c comprises a transverse opening 7h disposed near its tip to facilitate, by contraction of the walls forming the opening, the passage of the teeth of the tip. To maintain the harpoon element perfectly in the perforation 6a in the member 6, i.e. to avoid any axial movement of said harpoon element in the perforation, it comprises a supple, preferably hollow part 7i whose outer dimensions are greater than the diameter of the hole 6a. In this way, this supple part 7i abuts elastically against the wall of the hole 6a to prevent any axial clearance.

In accordance with the invention, the threaded connecting piece 7a extends opposite the harpoon element 7c by two slightly divergent elastic branches 7d, 7e. The outer faces of the branches 7d, 7e, preferably rounded, are roughly inscribed in a circumference whose diameter is greater than the internal diameter of the spring 5. It is observed that the rod 7b comprises a stop 7g of larger diameter.

To assemble the spring 5 and the connecting device according to the invention, it suffices to engage the branches 7d, 7e by force inside the corresponding end of the spring until the first turn of the spring abuts against the beginning of the threaded connecting piece 7a. The piece 7a is then screwed with respect to the turns until it comes into contact with the stop 7g. A friction fit is thus created between the free turns of the spring which are adjacent the turns engaged with the connecting piece 7a and the branches 7d, 7e so that, during the extensions and contractions of the turns of the spring 5, they are braked or dampened and cannot enter into resonance. To that end, the device according to the invention is made by molding, advantageously by injection in one piece, of a plastic material such as a polyamide. This process of manufacture is very economical and makes it possible to obtain an assembly device which is resistant to traction (FIG. 3). It is observed in FIG. 4 that, in transverse section, the outer faces of the two branches 7d, 7e may be convex so as to cooperate as best possible with the interior of the turns of the spring 5. The outer radius of curvature of such faces being close to that of the interior of the spring.

Figure 5:
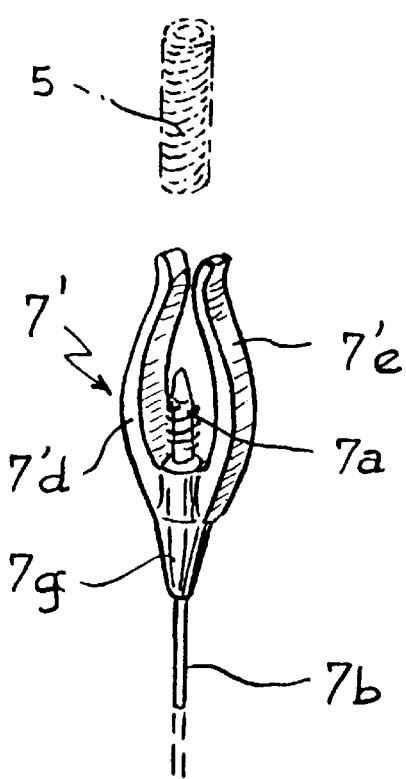
FIG. 5 illustrates in perspective a another embodiment of the device of FIG. 2.

According to a first various of the invention illustrated in FIG. 5, a connecting device 7' has been provided, of which the branches 7'd and 7'e issue from the stop 7g and extend on either side of the threaded connecting piece 7a. It is observed that the branches 7'd, 7'e are convergent, so that, on at least a part of the surface of their opposite inner faces, said such faces are spaced at a distant less than the outer diameter of the spring 5.

Figure 6:
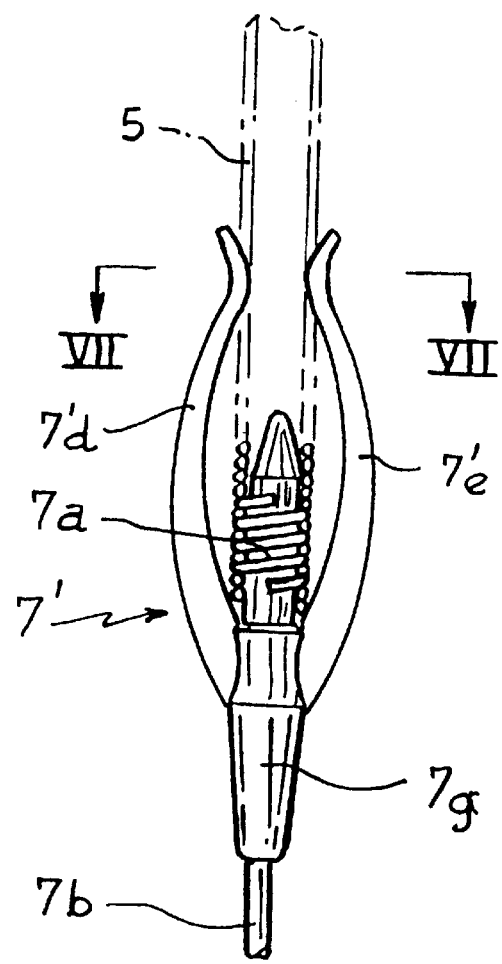
FIG. 6 is a view showing the device of FIG. 5 mounted with respect to the end of a spring.
Figure 7:
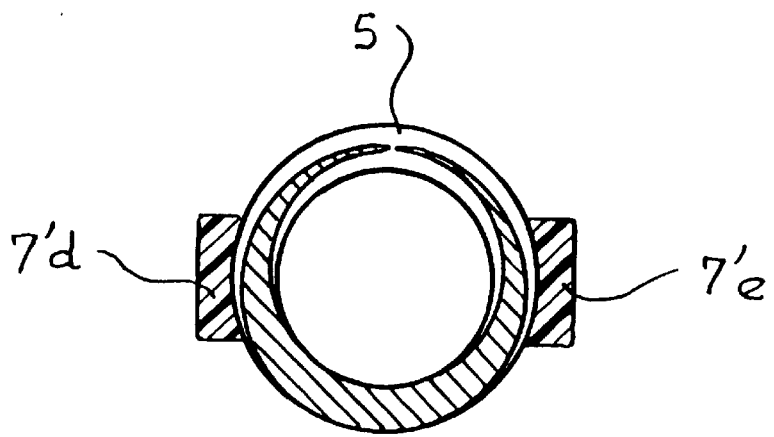
FIG. 7 is a section on a larger scale along VII—VII (FIG. 6).

To assemble the spring 5 and the connecting device 7' according to this embodiment, the two branches 7'd, 7'e must be moved slightly apart, then the corresponding end of the spring 5 introduced between the branches so that the threaded connecting piece 7a threadingly engages with the turns of the end of the spring until the spring bears against the stop 7g. On releasing the two branches, they compress the spring slightly and create with its free turns a friction avoiding resonance of the spring during its extensions and contractions (FIG. 6). As illustrated in FIG. 7, the inner faces of the branches 7'd, 7'e may be provided to be concave so as to cooperate with the exterior of the turns or coils of the spring 5.

According to the embodiment of FIG. 8 which constitutes a variation 7" of the connecting device, the two branches 7"d, 7"e are curved and joined at their free ends to form a tip 7"f. As for the embodiment of FIG. 2, the outer faces of the branches 7"d, 7"e are roughly inscribed in a circumference whose diameter is greater than the inner diameter of the spring 5.

To assemble the spring 5 and the connecting device 7", it suffices to engage the branches 7"d, 7"e by force inside the spring until its first turn or coil cooperates with the beginning of the threaded connecting piece 7"a. The piece 7'a is then screwed with respect to the spring until the end of the spring comes into contact with the stop 7"g. The turns of the spring adjacent those which cooperate with the threaded connecting piece 7"a are then slightly moved apart to create a friction fit so that the spring cannot enter into resonance during its extensions and contractions.

Another variation 7''' of the connecting device according to the invention is constituted by the combination of the connections illustrated in FIGS. 2 and 8. This preferred embodiment of the invention therefore comprises, from the threaded connecting piece 7'''a, two curved elastic branches 7'''d, 7'''e joined at their free ends to form a base 7'''f from which the two similar divergent branches 7d and 7e of FIG. 2 extend.

The connecting device 7''' is positioned inside the spring 5 by successively introducing the two divergent branches and then the two curved branches inside the spring, penetration being effected until the end of the spring bears against the stop 7'''g. This structure allows a double contact with the spring turns to create better elimination of the resonance.

The connection 7'''' according to FIG. 10 includes the embodiment of the connection 7" to which the two convergent branches 7'd, 7'e of connection 7' of FIG. 5 have been added. There again, two zones of frictional engagement with the spring are obtained to improve elimination of resonance.

Finally, FIG. 11 illustrates a connection 7''''' combining the connection 7''' of FIG. 9 and connection 7' of FIG. 5. This connection makes it possible to create three zones of contact with the turns of the spring.

It goes without saying that the upper part or head of the devices illustrated in FIGS. 2, 5 and 8 to 11 may be manufactured separately, i.e. without the rod and the harpoon to form an overmolded connection at the stop on the lower end of one of the heddles 4 illustrated in FIG. 1. Because of this structure, the two ends of each spring 5 may be assembled in accordance with the invention on the one hand on a heddle 4, on the other hand, on a fixed member such as 6.

In accordance with another variation of the invention, a member is produced by means of two devices 7 oriented in opposition to each other by their stop, so that they may cooperate respectively with the ends of two springs in order to assemble them in line with each other and to avoid resonance.

What is claimed is:

1. A connecting device for dampening resonance of a helical spring which includes coils defined by an inner diameter and an outer diameter which coils are alternatively extended and compressed relative to one another and wherein the spring includes a remote end secured to a first spaced member and a free end, the connecting device comprising, a body having a threaded portion adapted to be threadingly received with the free end of the spring and a spaced end portion adapted to be engageable with a second spaced member, at least two elastic branches extending from said body which are elastically movable with respect to one another along at least a portion of their length, said at least two elastic branches being oriented relative to said threaded portion so as to be adapted to frictionally engage the coils of the spring to thereby prevent resonance of the spring when said threaded portion is received within the coils of the spring.

2. The connecting device of claim 1 wherein said at least two elastic branches are divergent relative to one another extending from said threaded portion, said elastic branches having outer faces which are curved along an arc segment of a circumference having a diameter greater than the inner diameter of the coils of the spring.

3. The connecting device of claim 1 wherein said at least two branches have outer ends which converge and are joined so as to form a tip which facilitates introduction of the connecting device within the coils of the spring.

4. The connecting device of claim 1 wherein said at least two elastic branches have convergent portions, said elastic branches having opposing inner faces which are spaced along at least a portion of their length at a distance with respect to one another less than the outer diameter of the coils of the spring.

5. The connecting device of claim 4 wherein said at least two elastic branches extend outwardly from said body and adjacent to and spaced from said threaded portion, at least two elastic inner branches extending from said threaded portion of said body and having outer ends which are joined to form a tip adapted to facilitate penetration of said inner branches within the coils of the spring.

6. The connecting device of claim 5 including at least two extension branches extending from the tip of said at least two inner branches, each of said extension branches being elastically divergent with respect to one another and having outer faces which are generally arcuate and extend along an arc segment of a circumference having a diameter which is greater than the inner diameter of the coils of the spring.

7. The connecting device of claim 1 wherein said at least two branches are curved and are joined to form a tip which is adapted to facilitate introduction of the connecting device within the coils of the spring.

8. The connecting device of claim 1 wherein said body is adapted to be molded on an end of a heddle of a weaving system for a weaving loom.

9. In a weaving loom having a harness system including a oscillating heddle connected to a spring wherein the spring includes coils defined by an inner diameter and an outer diameter which coils are alternately extended and compressed upon the oscillating movement of the heddle and wherein the spring includes an end secured to the heddle and a free end, the improvement comprising, a connecting device including a body having a threaded portion adapted to be threadingly received within the free end of the spring and a spaced end portion adapted to be engageable with a spaced member associated with the weaving loom, at least two elastic branches extending from said body which are elastically movable with respect to one another and which are spaced with respect to one another along at least a portion of their length, said at least two elastic branches being frictionally engaged with the coils of the spring to thereby prevent resonance of the spring during the oscillating movement of the heddle.

10. The connecting device of claim 9 wherein said at least two elastic branches are divergent relative to one another extending from said threaded portion, said elastic branches having outer faces which are curved along an arc segment of a circumference having a diameter greater than the inner diameter of the coils of the spring.

11. The connecting device of claim 10 wherein said at least two branches have outer ends which converge and are joined so as to form a tip which facilitates introduction of the connecting device within the coils of the spring.

12. The connecting device of claim 9 wherein said at least two elastic branches have convergent portions, said elastic branches having opposing inner faces which are spaced along at least a portion of their length at a distance with respect to one another less than the outer diameter of the coils of the spring.

13. The connecting device of claim 12 herein said at least two elastic branches extend outwardly from said body and adjacent to and spaced from said threaded portion, at least two elastic inner branches extending from said threaded portion of said body and having outer ends which are joined to form a tip to facilitate penetration of said inner branches within the coils of the spring.

14. The connecting device of claim 13 including at least two extension branches extending from the tip of said at least two inner branches, each of said extension branches being elastically divergent with respect to one another and having outer faces which are generally arcuate and extend along an arc segment having a diameter which is greater than the inner diameter of the coils of the spring.

15. The connecting device of claim 9 wherein said at least two branches are curved and are joined to form a tip to facilitate introduction of the connecting device within the coils of the spring.

* * * * *